(12) United States Patent
Kim

(10) Patent No.: US 8,649,448 B2
(45) Date of Patent: Feb. 11, 2014

(54) DEMAPPING DEVICE AND METHOD FOR MODIFIED DUAL CARRIER MODULATION SYSTEM

(75) Inventor: Byoung-Hak Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 12/962,339

(22) Filed: Dec. 7, 2010

(65) Prior Publication Data

US 2011/0135040 A1 Jun. 9, 2011

(30) Foreign Application Priority Data

Dec. 8, 2009 (KR) ........................ 10-2009-0121211

(51) Int. Cl.
*H04K 1/10* (2006.01)
*H04L 27/28* (2006.01)
(52) U.S. Cl.
USPC .............. 375/260; 375/259; 455/59; 370/464
(58) Field of Classification Search
None
See application file for complete search history.

(56) References Cited

U.S. PATENT DOCUMENTS

2002/0131515 A1* 9/2002 Rodriguez .................... 375/262
2002/0159535 A1 10/2002 Agami et al.
2008/0152027 A1* 6/2008 Kalluri et al. ................. 375/260
2009/0274235 A1* 11/2009 Lee et al. ...................... 375/267
2012/0230220 A1* 9/2012 hlander .......................... 370/252

FOREIGN PATENT DOCUMENTS

| JP | 11-136207 | 5/1999 |
| KR | 10-2007-0110656 | 11/2007 |
| KR | 10-0880664 | 1/2009 |

* cited by examiner

*Primary Examiner* — Shuwang Liu
*Assistant Examiner* — Gina Mckie
(74) *Attorney, Agent, or Firm* — Staas & Halsey LLP

(57) ABSTRACT

Disclosed herein is a demapping device and method for a Modified Dual Carrier Modulation (MDCM) system. The demapping device comprises: the received signal processing unit receives an MDCM signal preprocessed by an operation preparation unit, and calculates differences between squares of distances between the received signal and a plurality of constellation points; the index search unit searches for a constellation point closest to the received signal based on the differences between squares of distances between the received signal and each of a plurality of constellation points; and the demapping operation unit searches for constellation points close to the closest constellation point, and sends demapping result data to a decoding device. The demapping result is obtained by demapping based on differences between squares of distances between the closest constellation point and the close constellation points.

18 Claims, 4 Drawing Sheets

FIG. 1 - PRIOR ART
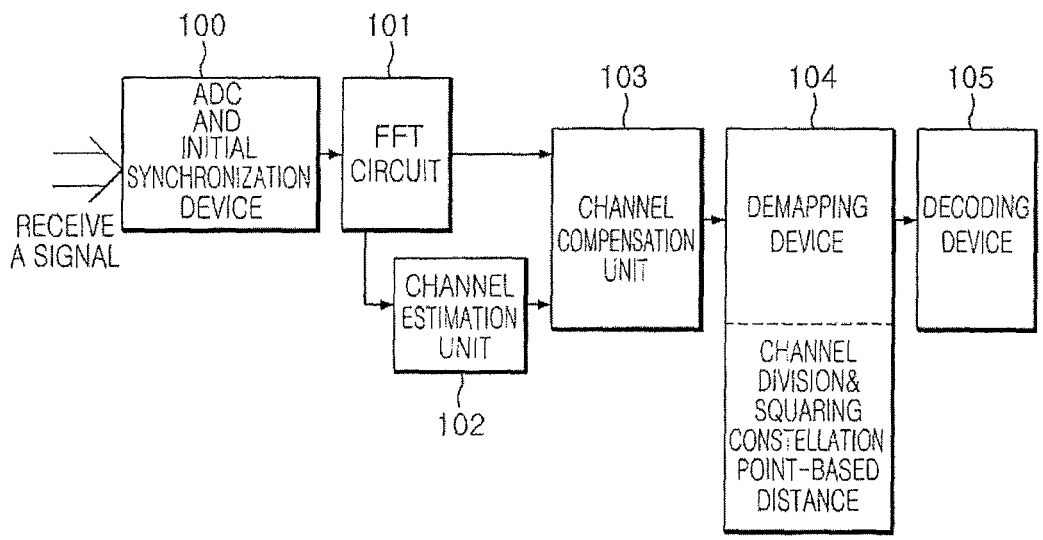
FIG. 2
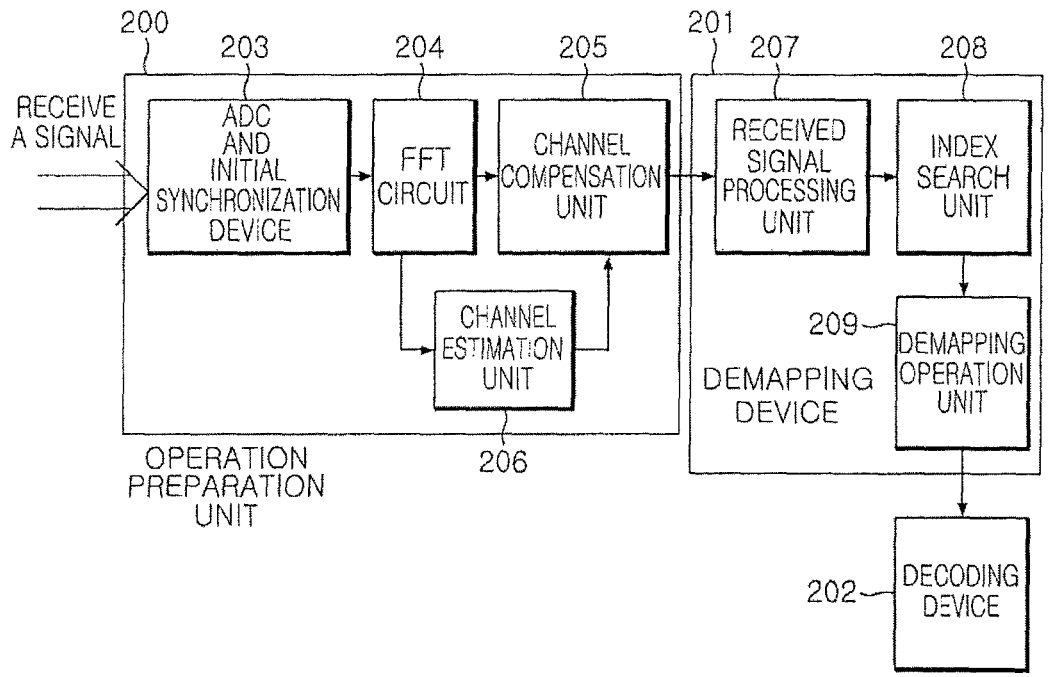

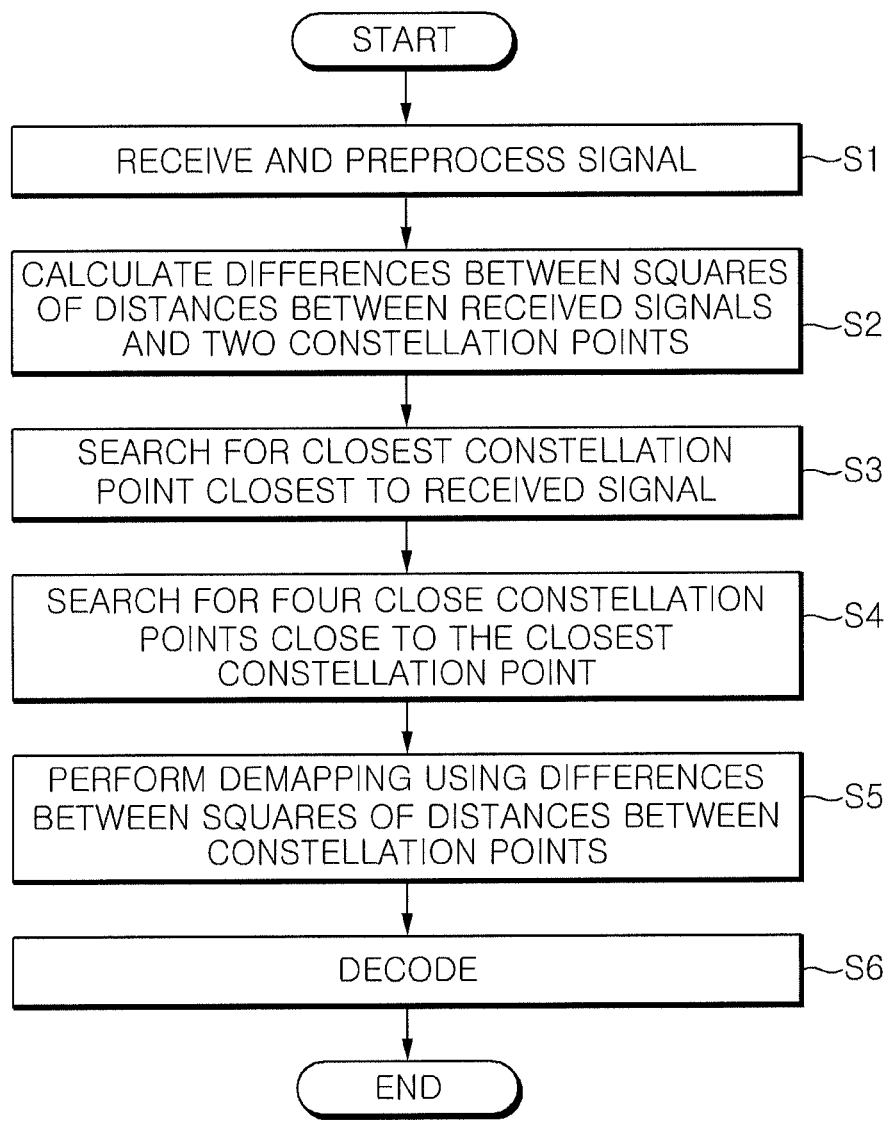

DEMAPPING DEVICE AND METHOD FOR MODIFIED DUAL CARRIER MODULATION SYSTEM

CROSS REFERENCE TO RELATED APPLICATION

This application claims the benefit of Korean Patent Application No. 10-2009-0121211, filed on Dec. 8, 2009, which is hereby incorporated by reference in its entirety into this application.

BACKGROUND OF THE INVENTION

1. Technical Field

The present invention relates generally to a demapping technology for a Modified Dual Carrier Modulation (MDCM) scheme in a Multi-Band Orthogonal Frequency Division Multiplexing Ultra Wide Band (MB-OFDM UWB) system, and, more particularly, to a technology which enables the demapping of MDCM received signals to be performed using division and square root operations in the real number domain instead of complicated division and square root operations.

2. Description of the Related Art

With the expansion of the communication market and the advance of technology, research into wireless data communication is continuously expanding. In particular, the modulation and demodulation technology which is used in wireless data communication to modulate data into a transmittable and receivable form, to send the modulated signal, and to enable a reception unit to demodulate and analyze the modulated signal is being widely researched. The technology for maximizing the data rate by maximally utilizing a predetermined bandwidth is being researched.

Recently, with regard to wireless data communication technology, Ultra Wide Band (UWB) technology is being increasingly researched, along with Bluetooth. UWB technology is adapted to perform broadband data transmission and reception so as to transmit a large amount of data at ultrahigh speed, and is evaluated as having high utility in those fields requiring the transmission and reception of a large amount of data, such as the fields of high definition TV or home networking.

With regard to UWB technology, a Multi-Band Orthogonal Frequency Division Multiplexing Ultra Wide Band (MB-OFDM UWB) system is attracting attention as a technology which is capable of effectively using broad band in UWB technology. The above-described MB-OFDM UWB system is being widely researched because of its compatibility with other communication methods and capability to transmit and receive a large amount of data. In particular, in the MB-OFDM UWB system, research into the modulation and demodulation of data is considered to be important.

The MB-OFDM UWB system uses a Modified Dual Carrier Modulation (MDCM) scheme as the newest data modulation scheme. Research into demodulation at a receiving apparatus based on the modulation scheme and demapping used for the demodulation is being widely carried out. The MDCM scheme was proposed by WiMedia to support data transmission and reception at a data rate equal to or higher than 640 Mbps. In the MDCM scheme, modulation, that is, the creation of a transmission signal, is performed by creating data in the form of coordinate points each having predetermined complex coordinates.

FIG. 1 is a block diagram showing the configuration of a conventional MDCM scheme-based demapping device. Generally, in the MDCM scheme, a transmission signal is created using the following Equation:

$$\begin{pmatrix} d[k] \\ d[k+50] \end{pmatrix} = \begin{pmatrix} 4 & 1 \\ 1 & -1 \end{pmatrix} \begin{pmatrix} x_a \\ x_b \end{pmatrix} \quad (1)$$

$x_a$, $x_b$ are complex numbers each of which has value I_out+ j*Q_out which is determined based on an input bit string (for example, of 8 bits) and the following table.

TABLE 1

| Input bits | I-out | Q-out |
| --- | --- | --- |
| 0000 | −3 | −3 |
| 0001 | −3 | −1 |
| 0010 | −3 | 3 |
| 0011 | −3 | 1 |
| 0100 | −1 | −3 |
| 0101 | −1 | −1 |
| 0110 | −1 | 3 |
| 0111 | −1 | 1 |
| 1000 | 3 | −3 |
| 1001 | 3 | −1 |
| 1010 | 3 | 3 |
| 1011 | 3 | 1 |
| 1100 | 1 | −3 |
| 1101 | 1 | −1 |
| 1110 | 1 | 3 |
| 1111 | 1 | 1 | k is the index of a subcarrier. 50 pairs of $(x_a, x_b)$ are received, and a total of 100 d[k]s (k=0~99) are created using the above-described Equation and then transmitted in the form of a single OFDM symbol. d[k] and d[k+50] are complex numbers, and can be represented as $d_R[k]+j*d_I[k]$ and $d_R[k+50]+j*d_I[k+50]$, respectively. R denotes the real number part and I denotes the imaginary number part of the relevant complex number.

Since the transmission signal is converted into complex numbers using the above-described Equation, the transmission signal can be plotted at complex coordinates, and can be mapped to constellation points at the complex coordinates. Thereafter, a signal for the determined constellation points is transmitted, and a reception unit which has received the signal, in turn, can demap the signal and use the demapped signal as data by using a demodulation device.

The mapped transmission signal is influenced by a channel H[k] for each subcarrier, and a received signal r[k] is received by the reception unit based on the following Equation:

$$r[k]=d[k]H[k]+N[k] \quad (2)$$

Here, H[k] denotes the channel of a k-th subcarrier, and N[k] denotes the noise signal of the k-th subcarrier. Accordingly, prior to demapping, a received signal which has been processed to detect only transmitted data should be created by preprocessing. In FIG. 1, an input signal modulated using an MDCM scheme passes through an Analog Digital Converter (ADC) and initial synchronization device 100 and a Fast Fourier Transform (FFT) circuit 101. The FFT circuit 101 converts the digital signal having passed through the ADC so that frequency and complex coordinate analysis can be performed thereon, and therefore only a signal, other than a noise signal, can be analyzed.

Thereafter, channel estimation for the received signal is performed (at a channel estimation unit 102). If the result of the channel estimation is $H_E[k]$ (estimated channel value)=

CE_I+j*CE_Q, the received signal is multiplied by the conjugate complex number of the estimated channel value and then results are passed through the channel compensation unit 103 which performs channel compensation. Thereafter, the demapping device 104 multiplies constellation points for each subcarrier (in the embodiment of the present invention, 16 constellation points) by the absolute value of the channel. Then, the received signal is divided by the absolute value of the channel depending on the results of the channel estimation, the squares of the distances to the constellation points for each subcarrier are calculated, and then a soft decision for demapping is performed.

The channel compensation unit 103 compensates the received signal for the estimated channel $H_E[k]$ using the following Equations. If there is no error with the channel compensation unit 103, $H_E[k]$ becomes exactly equal to channel $H[k]$, and the received signal also becomes $r_{FDE}[k]$ and $r_{FDE}[k+50]$.

$$r_{FDE}[k] = r[k]H_e^*[k] = (d[k]H[k] + N[k])H_e^*[k] \sim |H[k]|^2 d[k] + N_e[k]$$

$$r_{FDE}[k+50] = r[k+50]H_e^*[k+50] = (d[k+50]H[k+50] + N[k+50])H_e^*[k+50] \sim |H[k+50]|^2 d[k+50] + N_e[k+50]$$

(3)

Thereafter, the demapping device 104 divides $r_{FDE}[k]$ and $r_{FDE}[k+50]$ by $|H[k]|$ and $|H[k+50]|$ to perform demapping, and then performs demapping. As a result, $r_{map}[k]$ and the received signal $r_{demap}[k]$ are calculated as follows:

$$r_{map}[k] = |H[k]|d[k] + \frac{N_e[k]}{|H[k]|}$$ (4)

$$r_{map}[k+50] = |H[k+50]|d[k+50] + \frac{N_e[k+50]}{|H[k+50]|}$$

$$r_{demap}[k] = |H[k]|d_R[k] + \frac{N_{eR}[k]}{|H[k]|} + j\left(|H[k+50]|d_R[k+50] = \frac{N_{eR}[k+50]}{|H[k+50]|}\right)$$

$$r_{demap}[k+50] = |H[k]|d_I[k] + \frac{N_{eI}[k]}{|H[k]|} + j\left(|H[k+50]|d_I[k+50] + \frac{N_{eI}[k+50]}{|H[k+50]|}\right)$$

Thereafter, the demapping step of calculating the squares of the distances between the received signal $r_{demap}[k]$ and the constellation points, calculating a soft decision value based on the calculated squares of the distances and performing demapping is performed.

However, in the above-described conventional method, $r_{demap}[k]$ and $r_{demap}[k+50]$ must be calculated in order to calculate the above-described squares of the distances between the received signal $r_{demap}[k]$ and the 16 constellation points, the channel-compensated received signals must be divided by $|H[k]|$ and $|H[k+50]|$ in order to calculate $r_{demap}[k]$ and $r_{demap}[k+50]$ as described above, and it is necessary to multiply a transmission constellation point by $|H[k]|$ and $|H[k+50]|$. Furthermore, a square root operation is required in order to calculate $|H[k]|$ and $|H[k+50]|$. Accordingly, in this case, accuracy, processing speed (for example, 528M samples/s) and the degree of complexity related to division and square root operations are important. In order to accurately distinguish the above-described 16 constellation points and perform the above-described operations for the 16 constellation points, accurate division and square root operations are required. As a result, the load of the demapping system itself is increased, and therefore complicated operations are required, so that problems related to speed and efficiency occur.

SUMMARY OF THE INVENTION

Accordingly, the present invention has been made keeping in mind the above problems occurring in the prior art, and an object of the present invention is to provide a demapping device and method which can prevent division and square root operations when obtaining a soft decision value used to perform demapping after channel compensation.

Another object of the present invention is to provide a demapping device and method which can perform demapping using a simple structure capable of performing division operations in the real number domain using only channel-compensated $r_{FDE,R}[k]$ and $r_{FDE,R}[k+50]$ for a received signal without creating a demapping signal $r_{demap}[k]$, thereby being able to overcome the problem of a system load.

In order to accomplish the above objects, the present invention provides a demapping device for an MDCM system, comprising a received signal processing unit for receiving an MDCM signal preprocessed by an operation preparation unit, and calculating differences between squares of distances between the received signal and each of a plurality of constellation points to perform demapping; an index search unit for searching for a closest constellation point closest to the received signal based on the differences between squares of distances between the received signal and each of a plurality of constellation points; and a demapping operation unit for searching for close constellation points close to the closest constellation point, and sending demapping result data, obtained by demapping based on differences between squares of distances between the closest constellation point and each of the close constellation points, to a decoding device.

Additionally, in order to accomplish the above objects, the present invention provides a demapping method for an MDCM system, including receiving a preprocessed MDCM signal from an operation preparation unit and calculating differences between squares of distances between a received signal and each of a plurality of constellation points, used to perform demapping, by a received signal processing unit; searching for a constellation point closest to the received signal based on the differences between squares of distances between the received signal and each of a plurality of constellation points, by index search unit; searching for constellation points close to the closest constellation point by a demapping operation unit; and performing demapping based on differences between squares of distances between the closest constellation point and each of the close constellation points by the demapping operation unit.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram showing the configuration of a conventional MDCM-type demapping device;

FIG. 2 is a diagram showing the configuration of a demapping device and the entire receiving apparatus for an MDCM system according to an embodiment of the present invention;

FIG. 5 is a flowchart showing a demapping method for an MDCM system according to an embodiment of the present invention.

DESCRIPTION OF THE PREFERRED EMBODIMENTS

Figure 3:
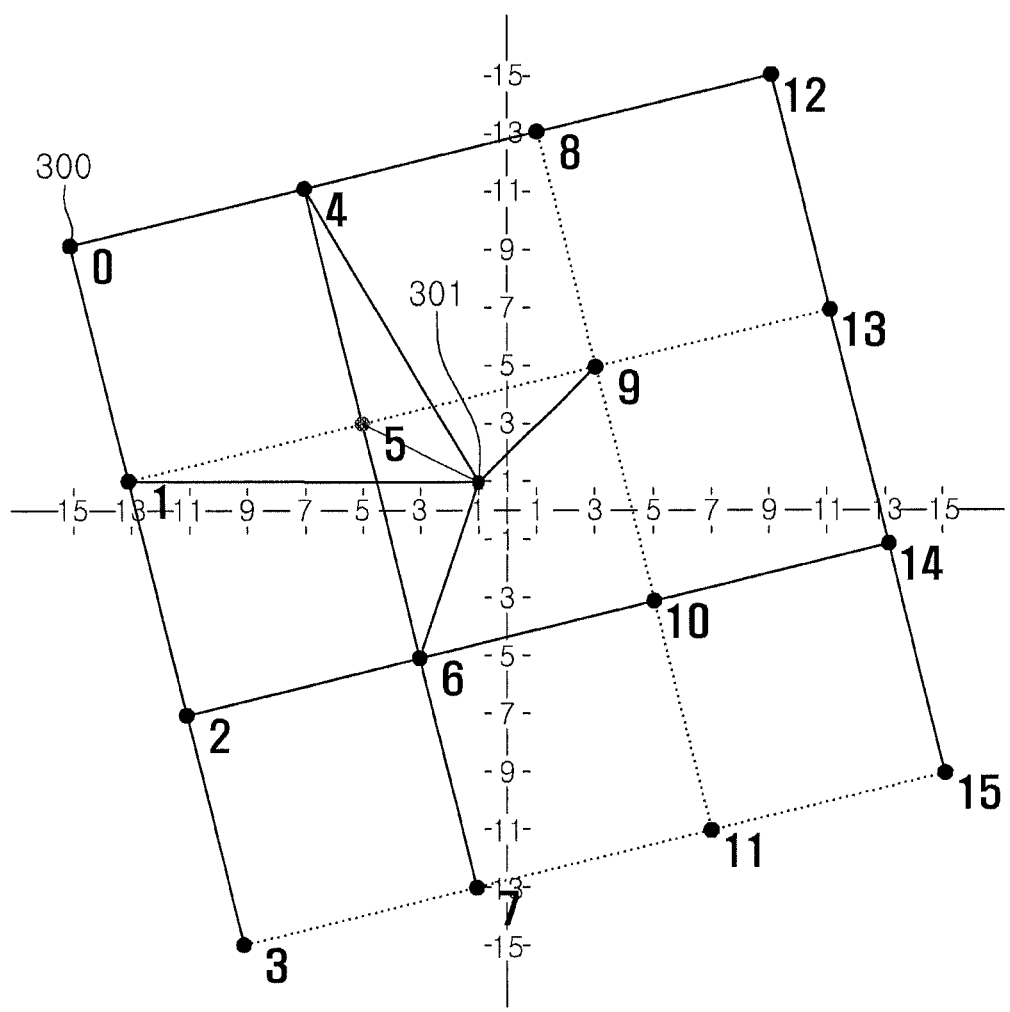
FIG. 3 is a diagram showing a received signal and receiving side-constellation points according to an embodiment of the present invention.

Reference now should be made to the drawings, in which the same reference numerals are used throughout the different drawings to designate the same or similar components.

A demapping device and method for MDCM systems according to an embodiment of the present invention will be described in detail below with reference to FIGS. 2 to 5. Detailed descriptions of the preprocessing technology and the same technology will be omitted here.

FIG. 2 is a diagram showing the configuration of a demapping device and the entire receiving apparatus for an MDCM system according to an embodiment of the present invention.

Referring to FIG. 2, the receiving apparatus of the MDCM system according to the embodiment of the present invention may include an operation preparation unit 200. The operation preparation unit 200 is a device which receives a transmitted signal modulated using the above-described MDCM scheme and which creates channel-compensated $r_{FDE,R}[k]$ and $r_{FDE,R}[k+50]$ with respect to the received signal using preprocessing, as described in conjunction with the conventional technology, so that demapping can be performed. The operation preparation unit 200 may include an ADC and initial synchronization device 203 for converting an analog signal into a digital signal and performing initial synchronization, an FFT device 204 for enabling demapping to be performed on a signal using an FFT in the complex frequency domain, a channel estimation unit 206 for estimating a signal channel for each constellation point and a received signal, and a channel compensation unit 205 for creating channel-compensated $r_{FDE,R}[k]$ and $r_{FDE,R}[k+50]$ with respect to the received signal based on the received signal and the estimated channel.

The operation preparation unit 200 functions to convert a received signal into channel-compensated $r_{FDE,R}[k]$ and $r_{FDE,R}[k+50]$ based on a modulated signal using the method described in conjunction with the conventional technology. The operation preparation unit 200 may further include a reception device (not shown) which receives a modified and transmitted signal. Although the operation preparation unit 200 may be configured such that the above-described components are formed of separate functionality-based devices, they are incorporated into a single processor or a microcomputer in this embodiment of the present invention.

The demapping device 201 for an MDCM system according to the embodiment of the present invention may include as its principal features a received signal processing unit 207, an index search unit 208, and a demapping operation unit 209.

First, the received signal processing unit 207 calculates the difference between the squares of the distances between a demapping target received signal (hereinafter referred to as the "received signal") $r_{demap}[k]$ and each of a plurality of constellation points using channel-compensated $r_{FDE,R}[k]$ and $r_{FDE,R}[k+50]$ with respect to the received signal, that is, an MDCM scheme-based signal, obtained by the preprocessing of the above-described operation preparation unit 200.

In the embodiment of the present invention, 16 constellation points are used to perform demapping on a received signal. The above-described calculation of the difference between the squares of the distances between the received signal $r_{demap}[k]$ and a plurality of constellation points refers to the calculation of the difference between the squares of the distances between the received signal $r_{demap[k]}$ and two constellation points. That is, 16 constellation points are arranged in pairs of two constellation points, and each pair of constellation points is divided into a first constellation point and a second constellation point. Thereafter, the difference between the square of the distance $E_{dindex1}$ between the received signal $r_{demap}[k]$ and the first constellation point and the square of the distance $E_{dindex2}$ between the received signal $r_{demap}[k]$ and the second constellation point are calculated. The difference between the squares of the distances between the received signal $r_{demap}[k]$ and the above-described two constellation points may be expressed by the following Equation:

$$E^2_{dindex1} - E^2_{dindex2} = ar_{FDE,R}[k] + br_{FDE,R}[k+50] + c|H[k]|^2 d|H[k+50]|^2 \quad (5)$$

Referring to Equation 5, when demapping is performed based on the received signal $r_{demap}[k]$, the difference between the squares of distances is obtained using only the channel-compensated $r_{FDE,R}[k]$ and $r_{FDE,R}[k+50]$ and the channel signal $H[k]$ and $H[k+50]$ without requiring the direct calculation of the received signal $r_{demap}[k]$ at the demapping device 201. Accordingly, the calculation that is performed is more efficient and simple calculation than that performed in the conventional technology. Equation 5 is used not only to calculate the difference between the squares of the distances between the received signal $r_{demap}[k]$ and two constellation points but also to obtain a soft decision value which is used for demapping. As a result, the effect of reducing the overall load exerted on the system by the demapping device 201 can be also achieved.

Since the number of constellation points is 16, 256 calculations using Equation 5 are required when the differences between the squares of the distances between the received signal $r_{demap}[k]$ and each pair of constellation points are all calculated. When redundant and unnecessary equations are removed, a total of 78 equations are required. Since the 79 equations include no division, the performance thereof is the same as the performance in the case where division in the real number domain rather than in the complex frequency domain is used, so that to the effect of being efficient is achieved.

Equation 5 contains a, b, c and d which are required to calculate the difference between the squares of the distances between the received signal $r_{demap}[k]$ and each of two constellation points. That is, a, b, c, and d of Equation 5 are required to calculate the differences between the squares of the distances between the received signal $r_{demap}[k]$ and each of the constellation points depending on the indexes of the constellation points, so that the received signal processing unit 207 may additionally store table data in which the coefficients have been arranged. Furthermore, preferably, in order to plot and identify the constellation points at complex coordinates, the functionality of storing complex coordinates data regarding a plurality of constellation points (for example, 16 constellation points) used to perform demapping may be further included. Examples in which a plurality of constellation points (for example, 16 constellation points) used to perform demapping have been plotted at complex coordinates are shown in FIGS. 3 and 4, and the following constellation points refer to constellation points identical to those shown in FIG. 3 or 4.

Figure 4:
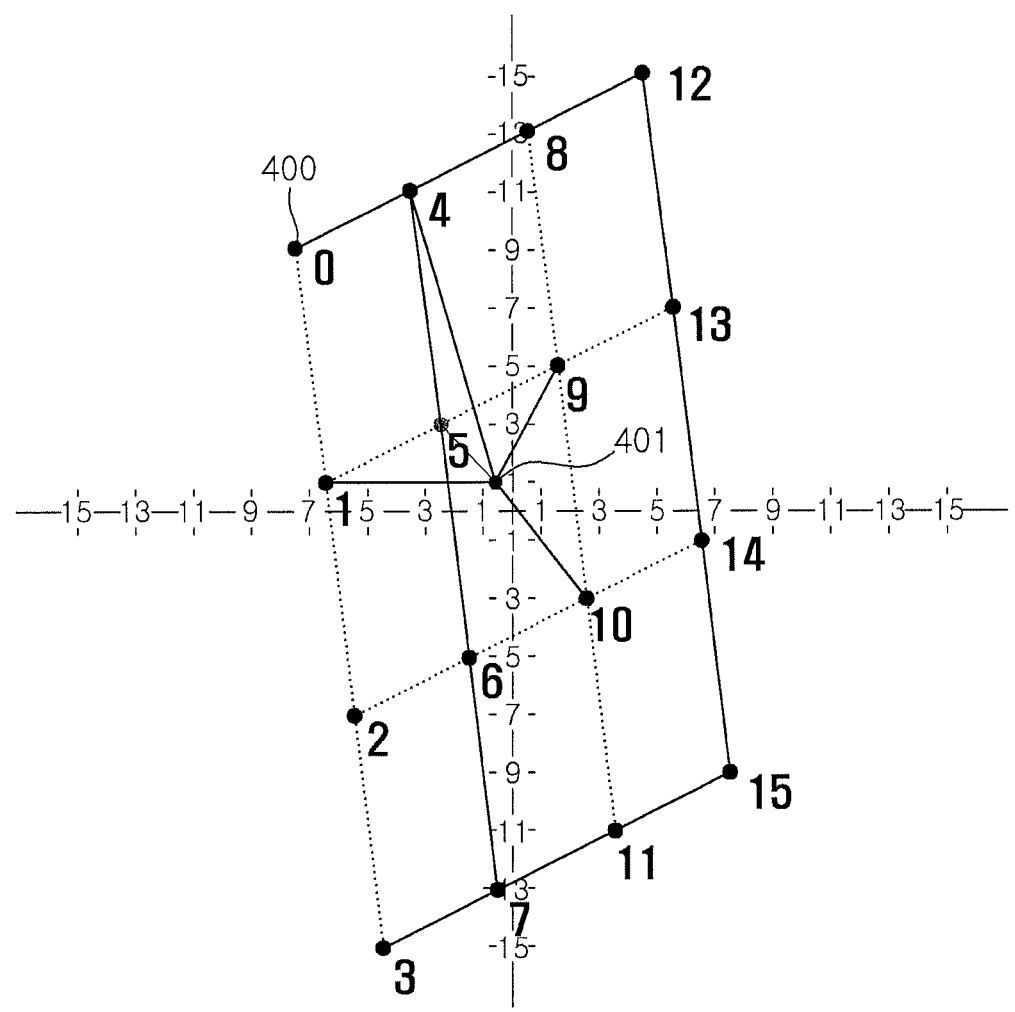
FIG. 4 is a diagram showing a received signal and receiving side-constellation points according to another embodiment of the present invention.

FIGS. 3 and 4 are diagrams showing received signals and receiving side-constellation points according to an embodiment and another embodiment of the present invention.

a, b, c, and d of Equation 5 which are required to calculate the differences between the squares of the distances between the received signal $r_{demap}[k]$ and constellation points may be listed as shown in the following table:

TABLE 2

| Constellation point index1 | Constellation point index2 | a (table value * 4) | b (table value * 4) | c (table value * 8) | d (table value * 8) |
|---|---|---|---|---|---|
| 0 | 1 | 1 | −4 | 7 | 10 |
| 0 | 4 | 4 | 1 | 22 | −5 |
| 0 | 5 | 5 | −3 | 25 | 9 |
| 0 | 6 | 6 | −7 | 27 | 7 |
| 0 | 7 | 7 | −11 | 28 | −11 |
| 0 | 9 | 9 | −2 | 27 | 7 |
| 0 | 13 | 13 | −1 | 13 | 4 |
| 1 | 2 | 1 | −4 | 6 | −6 |
| 1 | 4 | 3 | 5 | 15 | −15 |
| 1 | 5 | 4 | 1 | 18 | −1 |
| 1 | 6 | 5 | −3 | 20 | −3 |
| 1 | 7 | 6 | −7 | 21 | −21 |
| 1 | 8 | 7 | 6 | 21 | −21 |
| 1 | 10 | 9 | −2 | 18 | −1 |
| 1 | 12 | 11 | 7 | 11 | −28 |
| 1 | 14 | 13 | −1 | 0 | 0 |
| 2 | 3 | 1 | −4 | 5 | −22 |
| 2 | 4 | 2 | 9 | 9 | −9 |
| 2 | 5 | 3 | 5 | 12 | 5 |
| 2 | 6 | 4 | 1 | 14 | 3 |
| 2 | 7 | 5 | −3 | 15 | −15 |
| 2 | 9 | 7 | 6 | 14 | 3 |
| 2 | 11 | 9 | −2 | 9 | −9 |
| 2 | 13 | 11 | 7 | 0 | 0 |
| 2 | 15 | 13 | −1 | −13 | −4 |
| 3 | 4 | 1 | 13 | 4 | 13 |
| 3 | 5 | 2 | 9 | 7 | 27 |
| 3 | 6 | 3 | 5 | 9 | 25 |
| 3 | 7 | 4 | 1 | 10 | 7 |
| 3 | 10 | 7 | 6 | 7 | 27 |
| 3 | 14 | 11 | 7 | −11 | 28 |
| 4 | 5 | 1 | −4 | 3 | 14 |
| 4 | 8 | 4 | 1 | 6 | −6 |
| 4 | 9 | 5 | −3 | 5 | 12 |
| 4 | 10 | 6 | −7 | 3 | 14 |
| 4 | 11 | 7 | −11 | 0 | 0 |
| 4 | 13 | 9 | −2 | −9 | 9 |
| 5 | 6 | 1 | −4 | 2 | −2 |
| 5 | 8 | 3 | 5 | 3 | −20 |
| 5 | 9 | 4 | 1 | 2 | −2 |
| 5 | 10 | 5 | −3 | 0 | 0 |
| 5 | 11 | 6 | −7 | −3 | −14 |
| 5 | 12 | 7 | 6 | −7 | −27 |
| 5 | 14 | 9 | −2 | −18 | 1 |
| 6 | 7 | 1 | −4 | 1 | −18 |
| 6 | 8 | 2 | 9 | 1 | −18 |
| 6 | 9 | 3 | 5 | 0 | 0 |
| 6 | 10 | 4 | 1 | −2 | 2 |
| 6 | 11 | 5 | −3 | −5 | −12 |
| 6 | 13 | 7 | 6 | −14 | −3 |
| 6 | 15 | 9 | −2 | −27 | −7 |
| 7 | 8 | 1 | 13 | 0 | 0 |
| 7 | 9 | 2 | 9 | −1 | 18 |
| 7 | 10 | 3 | 5 | −3 | 20 |
| 7 | 11 | 4 | 1 | −6 | 6 |
| 7 | 14 | 7 | 6 | −21 | 21 |
| 8 | 9 | 1 | −4 | −1 | 18 |
| 8 | 12 | 4 | 1 | −10 | −7 |
| 8 | 13 | 5 | −3 | −15 | 15 |
| 8 | 14 | 6 | −7 | −21 | 21 |
| 8 | 15 | 7 | −11 | −28 | 11 |
| 9 | 10 | 1 | −4 | −2 | 2 |
| 9 | 12 | 3 | 5 | −9 | −25 |
| 9 | 13 | 4 | 1 | −14 | −3 |
| 9 | 14 | 5 | −3 | −20 | 3 |
| 9 | 15 | 6 | −7 | −27 | −7 |
| 10 | 11 | 1 | −4 | −3 | −14 |
| 10 | 12 | 2 | 9 | −7 | −27 |
| 10 | 13 | 3 | 5 | −12 | −5 |
| 10 | 14 | 4 | 1 | −18 | 1 |
| 10 | 15 | 5 | −3 | −25 | −9 |
| 11 | 12 | 1 | 13 | −4 | −13 |
| 11 | 13 | 2 | 9 | −9 | 9 |
| 11 | 14 | 3 | 5 | −15 | 15 |
| 11 | 15 | 4 | 1 | −22 | 5 |
| 12 | 13 | 1 | −4 | −5 | 22 |
| 13 | 14 | 1 | −4 | −6 | 6 |
| 14 | 15 | 1 | −4 | −7 | −10 |

Referring to Table 2, it can be seen that, for example, the difference between the squares of the distance between the received signal $r_{demap}[k]$ and each of the constellation points which are shown in FIG. 3 or 4 and have index values of 0 and 1 is expressed by $4(1*r_{FDE,R}[k]-4*r_{FDE,R}[k+50])+8(7*|H[k]|^2+10*|H[k+50]|^2)$.

Since Table 2 is also used to calculate a soft decision value used to perform demapping, like Equation 5, the received signal processing unit 207 may further include a functionality of transmitting the table data of Table 2 stored to the demapping operation unit 209.

In another embodiment of the present invention, the difference between the squares of the distances to constellation points can be obtained using the table which is obtained by simplifying Table 2. Table 2 presents the values of a, b, c, and d appearing in Equation 5 for all pairs of constellation points. However, when a, b, c, and d appearing in Table 2 are divided into fore a and b and hind c and d, Equation 5 is divided into fore $a*r_{FDE,R}[k]+b*r_{FDE,R}[k+50]$ and hind $c*|H[k]|^2+d*|H[k+50]|^2$. Based on the analysis of Table 2, $a*r_{FDE,R}[k]+b*r_{FDE,R}[k+50]$ is summarized into 8 equations and $c*|H[k]|^2+d*|H[k+50]|^2$ is summarized into 16 equations. Using combinations of summarized equations, the difference between the squares of the distance between a received signal and two constellation points can be obtained.

The 8 equations used to obtain $a*r_{FDE,R}[k]+b*r_{FDE,R}[k+50]$ of Equation 5 are summarized in the following Table 3:

TABLE 3

$AA = 1 * r_{FDE,R}[k] - 4 * r_{FDE,R}[k + 50]$
$BB = 4 * r_{FDE,R}[k] + 1 * r_{FDE,R}[k + 50]$
$CC = 5 * r_{FDE,R}[k] - 3 * r_{FDE,R}[k + 50]$
$DD = 3 * r_{FDE,R}[k] + 5 * r_{FDE,R}[k + 50]$
$EE = 6 * r_{FDE,R}[k] - 7 * r_{FDE,R}[k + 50] = CC + AA$
$FF = 2 * r_{FDE,R}[k] + 9 * r_{FDE,R}[k + 50] = DD - AA$
$GG = 7 * r_{FDE,R}[k] - 11 * r_{FDE,R}[k + 50] = CC + 2AA$
$HH = 1 * r_{FDE,R}[k] + 13 * r_{FDE,R}[k + 50] = DD - 2AA$

The 16 equations used to obtain $c*|H[k]|^2+d*|H[k+50]|^2$ of Equation 5 are summarized in the following Table 4:

TABLE 4

$D_{01} = A = 7 * |H[k]|^2 + 10 * |H[k + 50]|^2$
$B = -1 * |H[k]|^2 + 4 * |H[k + 50]|^2$
$C = -1 * |H[k]|^2 - 16 * |H[k + 50]|^2$
$D_{04} = E = 22 * |H[k]|^2 - 5 * |H[k + 50]|^2$
$F = -16 * |H[k]|^2 + -1 * |H[k + 50]|^2$
$G = -4 * |H[k]|^2 + 4 * |H[k + 50]|^2$
$D_{05} = I = 25 * |H[k]|^2 + 9 * |H[k + 50]|^2$
$J = -5 * |H[k]|^2 - 12 * |H[k + 50]|^2$
$D_{14} = K = 25 * |H[k]|^2 - 15 * |H[k + 50]|^2$
$L = -3 * |H[k]|^2 + 20 * |H[k + 50]|^2$
$D_{06} = M = 27 * |H[k]|^2 + 7 * |H[k + 50]|^2$
$N = -3 * |H[k]|^2 - 14 * |H[k + 50]|^2$
$D_{24} = P = 9 * |H[k]|^2 - 9 * |H[k + 50]|^2$

TABLE 4-continued $Q = -1 * |H[k]|^2 + 18 * |H[k + 50]|^2$
$D_{07} = R = -11 * |H[k]|^2 + 28 * |H[k + 50]|^2$
$D_{34} = S = 4 * |H[k]|^2 + 13 * |H[k + 50]|^2$ In another embodiment of the present invention using Tables 2 to 4, table used to solve Equation 5 is shown as follows:

The index search unit 208 functions to search for a constellation point closest to the received signal based on the difference between the squares of the distances between the received signal $r_{demap}[k]$ and each pair of constellation points calculated by the received signal processing unit 207 using the above-described Equation 4.

In greater detail, the index search unit 208 receives data about the difference between the squares of the distances between the received signal $r_{demap}[k]$ and each pair of con-

TABLE 5

| Constellation point index1 | Constellation point index2 | a (table value * 4) | b (table value * 4) | c (table value * 8) | d (table value * 8) | Equation |
|---|---|---|---|---|---|---|
| 0 | 1 | 1 | −4 | 7 | 10 | 4 * (AA) + 8 * (A) |
| 1 | 2 | 1 | −4 | 6 | −6 | 4 * (AA) + 8 * (A + C) |
| 2 | 3 | 1 | −4 | 5 | −22 | 4 * (AA) + 8 * (A + 2C) |
| 4 | 5 | 1 | −4 | 3 | 14 | 4 * (AA) + 8 * (A + B) |
| 5 | 6 | 1 | −4 | 2 | −2 | 4 * (AA) + 8 * (A + B + C) |
| 6 | 7 | 1 | −4 | 1 | −18 | 4 * (AA) + 8 * (A + B + 2C) |
| 8 | 9 | 1 | −4 | −1 | 18 | 4 * (AA) + 8 * (−A − B − 2C) |
| 9 | 10 | 1 | −4 | −2 | 2 | 4 * (AA) + 8 * (A − B − C) |
| 10 | 11 | 1 | −4 | −3 | −14 | 4 * (AA) + 8 * (−A − B) |
| 12 | 13 | 1 | −4 | −5 | 22 | 4 * (AA) + 8 * (−A − 2C) |
| 13 | 14 | 1 | −4 | −6 | 6 | 4 * (AA) + 8 * (−A − C) |
| 14 | 15 | 1 | −4 | −7 | −10 | 4 * (AA) + 8 * (−A) |
| 0 | 4 | 4 | 1 | 22 | −5 | 4 * (BB) + 8 * (E) |
| 1 | 5 | 4 | 1 | 18 | −1 | 4 * (BB) + 8 * (E + G) |
| 2 | 6 | 4 | 1 | 14 | 3 | 4 * (BB) + 8 * (E + 2G) |
| 3 | 7 | 4 | 1 | 10 | 7 | 4 * (BB) + 8 * (−E − 2F) |
| 4 | 8 | 4 | 1 | 6 | −6 | 4 * (BB) + 8 * (E + F) |
| 5 | 9 | 4 | 1 | 2 | −2 | 4 * (BB) + 8 * (E + F + G) |
| 6 | 10 | 4 | 1 | −2 | 2 | 4 * (BB) + 8 * (−E − F − G) |
| 7 | 11 | 4 | 1 | −6 | 6 | 4 * (BB) + 8 * (−E − F) |
| 8 | 12 | 4 | 1 | −10 | −7 | 4 * (BB) + 8 * (E + 2F) |
| 9 | 13 | 4 | 1 | −14 | −3 | 4 * (BB) + 8 * (−E − 2G) |
| 10 | 14 | 4 | 1 | −18 | 1 | 4 * (BB) + 8 * (−E − G) |
| 11 | 15 | 4 | 1 | −22 | 5 | 4 * (BB) + 8 * (−E) |
| 0 | 5 | 5 | −3 | 25 | 9 | 4 * (CC) + 8 * (I) |
| 1 | 6 | 5 | −3 | 20 | −3 | 4 * (CC) + 8 * (I + J) |
| 2 | 7 | 5 | −3 | 15 | −15 | 4 * (CC) + 8 * (I + 2J) |
| 4 | 9 | 5 | −3 | 5 | 12 | 4 * (CC) + 8 * (−J) |
| 5 | 10 | 5 | −3 | 0 | 0 | 4 * (CC) + 8 * (0) |
| 6 | 11 | 5 | −3 | −5 | −12 | 4 * (CC) + 8 * (J) |
| 8 | 13 | 5 | −3 | −15 | 15 | 4 * (CC) + 8 * (−I − 2J) |
| 9 | 14 | 5 | −3 | −20 | 3 | 4 * (CC) + 8 * (−I − J) |
| 10 | 15 | 5 | −3 | −25 | −9 | 4 * (CC) + 8 * (−I) |
| 1 | 4 | 3 | 5 | 15 | −15 | 4 * (DD) + 8 * (K) |
| 2 | 5 | 3 | 5 | 12 | 5 | 4 * (DD) + 8 * (K + L) |
| 3 | 6 | 3 | 5 | 9 | 25 | 4 * (DD) + 8 * (K + 2L) |
| 5 | 8 | 3 | 5 | 3 | −20 | 4 * (DD) + 8 * (−L) |
| 6 | 9 | 3 | 5 | 0 | 0 | 4 * (DD) + 8 * (0) |
| 7 | 10 | 3 | 5 | −3 | 20 | 4 * (DD) + 8 * (L) |
| 9 | 12 | 3 | 5 | −9 | −25 | 4 * (DD) + 8 * (−K − 2L) |
| 10 | 13 | 3 | 5 | −12 | −5 | 4 * (DD) + 8 * (−K − L) |
| 11 | 14 | 3 | 5 | −15 | 15 | 4 * (DD) + 8 * (−K) |
| 0 | 6 | 6 | −7 | 27 | 7 | 4 * (EE) + 8 * (M) |
| 1 | 7 | 6 | −7 | 21 | −21 | 4 * (EE) + 8 * (M + 2N) |
| 4 | 10 | 6 | −7 | 3 | 14 | 4 * (EE) + 8 * (−N) |
| 5 | 11 | 6 | −7 | −3 | −14 | 4 * (EE) + 8 * (N) |
| 8 | 14 | 6 | −7 | −21 | 21 | 4 * (EE) + 8 * (−M − 2N) |
| 9 | 15 | 6 | −7 | −27 | −7 | 4 * (EE) + 8 * (−M) |
| 2 | 4 | 2 | 9 | 9 | −9 | 4 * (FF) + 8 * (P) |
| 3 | 5 | 2 | 9 | 7 | 27 | 4 * (FF) + 8 * (P + 2Q) |
| 6 | 8 | 2 | 9 | 1 | −18 | 4 * (FF) + 8 * (−Q) |
| 7 | 9 | 2 | 9 | −1 | 18 | 4 * (FF) + 8 * (Q) |
| 10 | 12 | 2 | 9 | −7 | −27 | 4 * (FF) + 8 * (−P − 2Q) |
| 11 | 13 | 2 | 9 | −9 | 9 | 4 * (FF) + 8 * (−P) |
| 0 | 7 | 7 | −11 | 28 | −11 | 4 * (GG) + 8 * (R) |
| 4 | 11 | 7 | −11 | 0 | 0 | 4 * (GG) + 8 * (0) |
| 8 | 15 | 7 | −11 | −28 | 11 | 4 * (GG) + 8 * (−R) |
| 3 | 4 | 1 | 13 | 4 | 13 | 4 * (HH) + 8 * (S) |
| 7 | 8 | 1 | 13 | 0 | 0 | 4 * (HH) + 8 * (0) |
| 11 | 12 | 1 | 13 | −4 | −13 | 4 * (HH) + 8 * (−S) |

Referring again to FIG. 2, the index search unit 208 may be included in the demapping device 201 of the MDCM system.

stellation points from the received signal processing unit 207 first. Thereafter, based on the received data, a plurality of constellation points is searched for one or more constellation points each having the shortest distance in a row or a column when an arrangement having the indexes shown in FIG. 3 or 4 is given (in the embodiment of the present invention, the indexes of four constellation points each having the shortest distance in a row or a column using 12 differences between the squares of the distances for rows and columns are searched for). Unlike the conventional technology, the embodiment of the present invention is configured to calculate the difference between the squares of the distances between the received signal $r_{demap}[k]$ and each pair of constellation points, rather than to directly calculate the squares of the distances between the received signal $r_{demap}[k]$ and each of constellation points, so that the above-described searching method is performed.

Thereafter, one or more constellation points each having the shortest distance for each row or column are searched for the constellation point having the shortest distances both in a row and in a column. That is, the constellation point corresponding to the index at which the index value of the constellation point having the shortest distance for a relevant row and the index value of the constellation point having the shortest distance for a relevant column coincide with each other is searched for. In the embodiment of the present invention, it is assumed that the found constellation point is one in number. Accordingly, the found constellation point is the constellation point at which the distance between the received signal $r_{demap}[k]$ and the constellation point is shortest. However, if the number of found indexes is 2, that is, if the number of found constellation points is 2, the constellation point having the shortest distance and the index value of the constellation point are searched for using the sign of the squares of the distances between the received signal $r_{demap}[k]$ and constellation points having the found two index values.

When the index search unit 208 found the constellation point closest to the received signal $r_{demap}[k]$ and the index value of the constellation point using the above-described functionality, the demapping operation unit 209 receives data about the found constellation point (for example, the coordinates and index value of the constellation point), and performs demapping, more precisely calculates a soft decision value.

The detailed performance of the calculation functionality of the demapping operation unit 209 will be described with reference to FIGS. 3 and 4.

The demapping operation unit 209 receives the table data of Table 2 from the received signal processing unit 207 as described above. Thereafter, the demapping operation unit 209 performs demapping using Table 2 and Equation 5. In greater detail, the index $I_{min}$ of the constellation point found to be closest to the received signal $r_{demap}[k]$, the index $I_{min,tr}$ of a constellation point having the shortest distance in a row immediately above the index $I_{min}$ of the constellation point, the index $I_{min,br}$ of a constellation point having the shortest distance in a column immediately below the index $I_{min}$ of the constellation point, the index $I_{min,lc}$ of a constellation point having the shortest distance in a column on the left of the index $I_{min}$ of the constellation point, and the index $I_{min,rc}$ of a constellation point having the shortest distance in a column on the right of the index $I_{min}$ of the constellation point are searched for.

Thereafter, the difference between the squares of distances between the received signal $r_{demap}[k]$, and the indexes $I_{min,tr}$, $I_{min,br}$, $I_{min,lc}$, and $I_{min,rc}$ of the four constellation points found by the demapping operation unit 209 and the index $I_{min}$ of the constellation point found by the index search unit 208 is calculated based on Equation 5 and Table 2. Accordingly, the demapping operation unit 209 may further comprise the functionality of receiving the table data of Table 2 from the received signal processing unit 207 as described above.

For example, FIG. 3 illustrates the example in which received signal $r_{demap}[k]$ 301 is $(-1+j*1)$ and represents the complex coordinates of a constellation point on which the influence of a channel has not been exerted, so that the size of the channel is $|H[k]|=|H[k+50]|=1$. The above-described indexes are denoted by relatively large numbers in FIG. 3, and the constellation points 300 are denoted by indexes ranging from 0 to 15 because the number of constellation point is 16 in the embodiment of the present invention. Furthermore, in FIG. 3, the index $I_{min}$ of a constellation point closest to the received signal $r_{demap}[k]$ 301, that is, the index $I_{min}$ of a constellation point found by the index search unit 208, is 5. Accordingly, the indexes of four constellation points which are close to $I_{min}$ and are found by the demapping operation unit 209 are as follows: $I_{min,tr}$ is 4, $I_{min,br}$ is 6, $I_{min,lc}$ is 1, and $I_{min,rc}$ is 9.

Accordingly, the differences between the square of the distance between the received signal $r_{demap}[k]$ and $I_{min}$ and the squares of the distances between the received signal $r_{demap}[k]$ and $I_{min,tr}$, $I_{min,br}$, $I_{min,lc}$, and $I_{min,rc}$ are calculated. That is, the number of differences between the squares of the distances which should be calculated is 4. In FIG. 3, the differences between the square of the distance between the received signal $r_{demap}[k]$ and the index 5 and the squares of the distances between the received signal $r_{demap}[k]$ and the indexes 4, 6, 1, and 9 are calculated as described above.

Since the received signal $r_{demap}[k]$ 301 is $(-1+j*1)$ and $|H[k]|=|H[k+50]|=1$ as described above, $r_{FDE,R}[k]=r_{demap,R}[k]*|H[k]|=-1$ and $r_{FDE,R}[k+50]=r_{demap,I}[k]*|H[k+50]|=1$, so that the results of the calculation using Equation 5 and Table 2 are as follows. In the following calculation result table, calculation results are presented for each index pair.

TABLE 6

| Index pair | a * 4 | b * 4 | c * 4 | d * 4 | Calculated value | Soft decision parameter |
|---|---|---|---|---|---|---|
| 5, 4 | −4 | 16 | −24 | −112 | −116 | −1 |
| 5, 6 | 4 | −16 | 16 | −16 | −20 | 1 |
| 5, 1 | −16 | −4 | −144 | 8 | −124 | −1 |
| 5, 9 | 16 | 4 | 16 | −16 | −12 | 1 |

Referring to Table 6, it can be seen that soft decision parameters(Soft_Decision_parameters) exist. Soft decision parameters are values which are required to obtain soft decision values. Meanwhile, there are cases where an index pair is not found. For example, the index pair (5, 4) of Table 6 cannot be found in Table 2. In contrast, an index pair (4, 5) cannot be found in Table 2, in which case the values which are obtained by multiplying the coefficients of Table 2 for the index pair (4, 5) by −1 are used as relevant coefficients, so that the relevant calculation results of Table 6 can be obtained. In this case, a relevant soft decision parameter is −1, and, for the index pair found in Table 2, a relevant soft decision parameter is 1.

Another embodiment of the present invention shows an example in which the coordinates of constellation points vary due to channel distortion, as shown in FIG. 4.

FIG. 4 shows an example in which a received signal $r_{demap}[k]$ 401 is $(-0.5+j*1)$, the complex coordinates of constellation points based on channel distortion are represented, and, accordingly, the sizes of channels are $|H[k]|=0.5$ and $+|H[k+50]|=1$. Using the method identical to that of the analysis of FIG. 3, the index $I_{min}$ of the constellation point closest to the received signal $r_{demap}[k]$ 401 in FIG. 4, that is, the index $I_{min}$ of a constellation point found by the index search unit 208, is 5. Since the complex coordinates of a constellation point vary due to channel distortion, the indexes of four constellation points which are close to $I_{min}$ and are found by the demapping operation unit 209 are as follows: $I_{min,tr}$ is 4, $I_{min,br}$ is 10, $I_{min,lc}$ is 1, and $I_{min,rc}$ is 9.

Thereafter, like in the analysis of FIG. 3, the differences between the square of the distance between the received signal $r_{demap}[k]$ 401 and $I_{min}$ and the squares of the distances between the received signal $r_{demap}[k]$ 401 and $I_{min,tr}$, $I_{min,br}$, $I_{min,lc}$, and $I_{min,rc}$ are calculated. That is, the number of differences between the squares of the distances is 4. In FIG. 4, the differences between the square of the distance between the received signal $r_{demap}[k]$ 401 and index 5 and the squares of the distances between the received signal $r_{demap}[k]$ 401 and indexes 4, 10, 1, and 9 are calculated. Since the received signal $r_{demap}[k]$ 401 is $(-0.5+j*1)$, $|H[k]|=0.5$, and $|H[k+50]|=1$ as described above, $r_{FDE,R}[k]=r_{demap,R}[k]*|H[k]|=-0.25$ and $r_{FDE,R}[k+50]=r_{demap,I}[k]*|H[k+50]|=1$. The results of calculation using Equation 5 and Table 2 are as follows. In the following calculation result table, calculation results are presented for each index pair.

TABLE 7

| Index pair | a * 4 | b * 4 | c * 4 | d * 4 | Calculated value | Soft decision parameter |
|---|---|---|---|---|---|---|
| 5, 4 | −4 | 16 | −24 | −112 | −111 | −1 |
| 5, 10 | 20 | −12 | 0 | 0 | −17 | 1 |
| 5, 1 | −16 | −4 | −144 | 8 | −28 | −1 |
| 5, 9 | 16 | 4 | 16 | −16 | −12 | 1 |

Referring to Table 7, it can be seen that in the case where an index pair is not found, calculations are performed by searching for a reversed index pair, multiplying relevant coefficients by −1 and substituting resulting values into Equation 2, like in the analysis of Table 3. In this case, it can be seen that the soft decision parameter is also −1.

Thereafter, the demapping operation unit 209 obtains soft decision values based on the calculation results, and performs demapping. The demapping operation unit 209 calculates the soft decision values using the following Equation:

$$\text{soft\_decision\_value} = d\text{weight} \times \text{soft\_decision\_parameter} \times (E^2_{dindex1} - E^2_{dindex2}) + 2^{N-1} \quad (6)$$

Referring to Equation 6, variable dweight is a weight value for the difference between the squares of the distances between each of constellation points, and soft decision parameter soft_decision_parameter is a variable having a value of −1 or 1. The soft decision parameter soft_decision_parameter varies depending on the results of the above-described index pair search, and is a variable which is required because decision bits vary for each constellation point. Furthermore, N denotes the number of bits of a soft decision to be calculated. In the embodiment of the present invention, it is assumed that N=4. Furthermore, it will be apparent that each soft decision value used to perform demapping is an integer in a range from 0 to $2^N-1$ depending on the number of soft decision bits.

Accordingly, since the embodiment of FIG. 4 takes the case where N=4 as an example, each soft decision value must be an integer in a range from 0 to 15 as described above. If the soft decision value is calculated as a value less than 0, the soft decision value is determined to be 0. In contrast, if the soft decision value is calculated as value greater than 15, the soft decision value is determined to be 15. As a result, in FIG. 4, when substitution into Equation 6 is performed for each index pair, the first bit of FIG. 4 is determined to be 0, the second bit is determined to be 15, the third bit is determined to be 0, and the fourth bit is determined to be 15, thus completing demapping.

Since the demapping device for an MDCM system according to the embodiment of the present invention performs demapping using the above-described method, it is not necessary to directly obtain the received signal $r_{demap}[k]$, unlike in the conventional technology. Furthermore, since calculation is performed using only division operations in the real number domain instead of complicated division and square root operations in the complex number domain, the simplification of operations can be achieved. As a result, a system load can be minimized, and the range of use based on the performance of the system can be expanded due to the low system load, compared to that of the conventional technology.

A description of a demapping method using the demapping device of an MDCM system according to an embodiment of the present invention will now be given below. Detailed descriptions of the demapping device of the MDCM system will be omitted here.

Referring to FIG. 5, step S1 at which the operation preparation unit 200 receives an MDCM transmission signal and performs preprocessing is performed. Thereafter, step S2 at which the received signal processing unit 207 calculates the differences between the squares of the distances between the received signal and received signal-side constellation points (for example, 16 constellation points) using the above-described Equation 4 is performed. In the embodiment of the present invention, the difference between the squares of the distance between the received signal and each pair of two constellation points is calculated, with the result that step S2 includes repeating the calculation of the distance between the received signal and each pair of two constellation points for all pairs of constellation points.

Thereafter, step S3 at which the index search unit 208 searches for a constellation point having the shortest distance to the received signal is performed. Then step S4 at which the demapping operation unit 209 searches for constellation points close to the constellation point which has the shortest distance to the received signal and is found by the index search unit 208 is performed. In the embodiment of the present invention, four constellation points which have the respective shortest distances in a row immediately above, a row immediately below, a column on the left of and a column on the right of the constellation point which is closest to the received signal and is found by the index search unit 208 are searched for as described above. Thereafter, the difference between the square of the distance between the received signal and the constellation point having the shortest distance and the squares of the distances between the received signal and the four found constellation points are calculated using Equation 4. Then, step S5 of performing demapping in such a way as to obtain a soft decision value by substituting the difference between the squares of the distances into Equation 5 is performed. Thereafter, step S6 at which the demapping operation unit 209 sends the demapped data to perform decoding is performed.

The demapping device and method according to the present invention have the advantage of providing a scheme which does not use complicated operations to obtain a soft decision value used to perform demapping, unlike in the conventional technology. The device and method of the present invention have the advantages of being able to efficiently and simply perform demapping for an MDCM system because the device and method exerts a load identical to the load in the case of the use of division operations in the real number domain on the system. The device and method of the present invention have the advantages of increasing processing speed and expanding the range of use because a high-specification system is not required.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A demapping device for a Modified Dual Carrier Modulation (MDCM) system, comprising:
    a received signal processing unit to receive an MDCM signal preprocessed by an operation preparation unit, and calculate differences between squares of distances between a received signal and each of a plurality of constellation points, to perform demapping;
    an index search unit to search for a constellation point closest to the received signal based on the differences between squares of distances between the received signal and the plurality of constellation points; and
    a demapping operation unit to search for constellation points close to the closest constellation point, and send demapping result data, obtained by demapping the received signal based on differences between squares of distances between the closest constellation point and each of the constellation points close to the closest constellation point, to a decoding device,
    wherein the received signal processing unit calculates the difference between the squares of the distances between the received signal and each of the plurality of constellation points using the following equation:

$$E^2_{dindex1} - E^2_{dindex2} = ar_{FDE,R}[k] + br_{FDE,R}[k+50] + c|H[k]|^2 + d|H[k+50]|^2$$

where $E_{dindex1}$ is a distance between the received signal $r_{demap}[k]$ received via subcarrier k and a first constellation point, $E_{dindex2}$ is a distance between the received signal $r_{demap}[k]$ and a second constellation point, $r_{FDE,R}[k]$ is a real number part of a channel compensation value for the signal $r_{demap}[k]$ received via the subcarrier k, $r_{FDE,R}[k+50]$ is a real number part of a channel compensation value for the received signal received via subcarrier k+50, H[k] is a channel signal corresponding to the subcarrier k, H[k+50] is a channel signal corresponding to the subcarrier k+50, k is an integer of 0 to 49, and a,b,c and d are an integers.

2. The demapping device as set forth in claim 1, wherein the plurality of constellation points is 16 constellation points.

3. The demapping device as set forth in claim 1, wherein the received signal processing unit calculates the difference between squares of distances between the received signal and each pair of two constellation points for all pairs of constellation points included in the plurality of constellation points.

4. The demapping device as set forth in claim 1, wherein the received signal processing unit stores complex coordinate data for the plurality of constellation points.

5. The demapping device as set forth in claim 1, wherein the received signal processing unit stores a table which have values of a, b, c and d of Equation 1 for each of the plurality of constellation points.

6. The demapping device as set forth in claim 1, wherein the index search unit searches for a plurality of constellation points each having a shortest distance in a row or a column based on the differences between the squares of the distances between the received signal and the plurality of constellation points.

7. The demapping device as set forth in claim 1, wherein the index search unit searches for a plurality of constellation points each having a shortest distance in a row or a column and selects the closest constellation point, using the differences between the squares of the distances between the received signal and each of the plurality of constellation points.

8. The demapping device as set forth in claim 1, wherein the demapping operation unit selects the closest constellation point and four constellation points each having a shortest distance in a row or a column as the constellation points close to the closest constellation point.

9. The demapping device as set forth in claim 1, wherein the demapping operation unit calculates the differences between squares of distances between the closest constellation point and each of the close constellation points using the following equation:

$$E^2_{dindex1} - E^2_{dindex2} = ar_{FDE,R}[k] + br_{FDE,R}[k+50] + c|H[k]|^2 + d|H[k+50]|^2$$

where $E_{dindex1}$ is the distance between the received signal $r_{demap}[k]$ received via subcarrier k and the first constellation point, $E_{dindex2}$ is the distance between the received signal $r_{demap}[k]$ and the second constellation point, $r_{FDE,R}[k]$ is the real number part of the channel compensation value for the received signal $r_{demap}[k]$, $r_{FDE,R}[k+50]$ is the real number part of the channel compensation value for the received signal received via subcarrier k+50, H[k] is the channel signal corresponding to the subcarrier k, H[k+50] is the channel signal corresponding to the subcarrier k+50, k is the integer of 0 to 49, and a, b, c and d are integers.

10. The demapping device as set forth in claim 9, wherein the received signal processing unit stores a table which comprises values of the a, b, c and d of Equation 1 for each of the plurality of constellation points.

11. The demapping device as set forth in claim 1, wherein the demapping operation unit calculates soft decision values, used to perform demapping, using the following equation:

$$\text{soft\_decision\_values} = d\text{weight} \times \text{soft\_decision\_parameter} \times (E^2_{dindex1} - E^2_{dindex2}) + 2^{N-1}$$

where dweight is a weight value for the difference between the squares of the distances between the constellation points, $E_{dindex1}$ is a distance between the received signal $r_{demap}[k]$ and a first constellation point, $E_{dindex2}$ is a distance between the received signal $r_{demap}[k]$ and a second constellation point, soft_decision_parameter is a value of −1 or 1, and N is a number of bits of a soft decision to be calculated.

12. The demapping device as set forth in claim 1, wherein the demapping operation unit controls each of the soft decision values so that it is an integer in a range from 0 to $2^N-1$ when a number of bits of a soft decision used to perform demapping is N.

13. A demapping method for a Modified Dual Carrier Modulation (MDCM) system, comprising:
    calculating differences between squares of distances between a preprocessed MDCM signal received from an operation preparation unit, and each of a plurality of constellation points used to perform demapping, by a received signal processing unit;
    searching for a constellation point closest to the received signal based on the differences between squares of distances between the received signal and each of the plurality of constellation points, by an index search unit;

searching for constellation points close to the closest constellation point by a demapping operation unit; and performing demapping based on differences between squares of distances between the closest constellation point and each of the constellation points close to the closest constellation point by the demapping operation unit, wherein the calculating the differences is calculating the differences between squares of distances between the received signal and each of the plurality of constellation points using the following equation:

$$E^2_{dindex1} - E^2_{dindex2} = ar_{FDE,R}[k] + br_{FDE,R}[k+50] + c|H[k]|^2 + d|H[k+50]|^2$$

where $E_{dindex1}$ is a distance between the received signal $r_{demap}[k]$ received via subcarrier k and a first constellation point, $E_{dindex2}$ is a distance between the received signal $r_{demap}[k]$ and a second constellation point, $r_{FDE,R}[k]$ is a real number part of a channel compensation value for the received signal $r_{demap}[k]$, $r_{FDER}[k+50]$ is a real number part of a channel compensation value for the signal received via subcarrier k+50, H[k] is a channel signal corresponding to the subcarrier k, H[k+50] is a channel signal corresponding to the subcarrier k+50, k is an integer of 0 to 49, and a, b, c and d are integers.

14. The demapping method as set forth in claim 13, wherein the plurality of constellation points is 16 constellation points.

15. The demapping method as set forth in claim 13, wherein the searching for the constellation point closest to the received signal is searching for a plurality of constellation points each having a shortest distance in a row or a column and selecting the closest constellation point, based on the differences between the squares of the distances between the received signal and each of the plurality of constellation points.

16. The demapping method as set forth in claim 13, wherein the searching for the constellation points close to the closest constellation point is searching for four constellation points each having a shortest distance to the closest constellation point in a row or a column.

17. The demapping method as set forth in claim 13, wherein the performing demapping is calculating the differences between squares of distances between the closest constellation point and each of the constellation points close to the closest constellation point using the following equation:

$$E^2_{dindex1} - E^2_{dindex2} = ar_{FDE,R}[k] + br_{FDE,R}[k+50] + c|H[k]|^2 + d|H[k+50]|^2$$

where $E_{dindex1}$ is the distance between the received signal $r_{demap}[k]$ received via the subcarrier k and the first constellation point, $E_{dindex2}$ is the distance between the received signal $r_{demap}[k]$ and the second constellation point, $r_{FDE,R}[k]$ is the real number part of the channel compensation value for the received signal $r_{demap}[k]$, $r_{FDE,R}[k+50]$ is the real number part of the channel compensation value for the signal received via subcarrier k+50, H[k] is the channel signal corresponding to the subcarrier k, H[k+50] is the channel signal corresponding to the subcarrier k+50, k is the integer of 0 to 49, and a, b, c and d are integer coefficients.

18. The demapping method as set forth in claim 13, wherein the performing demapping comprises calculating soft decision values, used to perform demapping, using the following equation, and controlling each of the soft decision values so that it is an integer in a range from 0 to $2^N-1$ when a number of bits of a soft decision used to perform demapping is N:

$$\text{soft\_decision\_values} = d\text{weight} \times \text{soft\_decision\_parameter} \times (E^2_{dindex1} - E^2_{dindex2}) + 2^{N-1}$$

where dweight is a weight value for the difference between the squares of the distances between the constellation points, $E_{dindex}$, is a distance between the received signal $r_{demap}[k]$ received and a first constellation point, $E_{dindex2}$ is a distance between the received signal $r_{demap}[k]$ and a second constellation point, soft$_{13}$ decision_parameter is a value of −1 or 1, and N is a number of bits of a soft decision to be calculated.

\* \* \* \* \*